United States Patent [19]

Fu

[11] Patent Number: 4,814,066
[45] Date of Patent: Mar. 21, 1989

[54] REACTIVATION OF SPENT CATALYTIC CRACKING CATALYST

[75] Inventor: Chia M. Fu, Bartlesville, Okla.

[73] Assignee: Phillips Petroleum Company, Bartlesville, Okla.

[21] Appl. No.: 197,234

[22] Filed: May 19, 1988

[51] Int. Cl.$^4$ .................... C10G 11/05; B01J 38/66
[52] U.S. Cl. .................... 208/120; 208/52 CT; 502/26; 502/516; 502/518; 502/521
[58] Field of Search ............ 208/52 CT, 113, 120; 502/26, 32, 36, 35, 22, 54, 516, 521

[56] References Cited

U.S. PATENT DOCUMENTS

| | | | |
|---|---|---|---|
| 2,194,186 | 3/1940 | Pier et al. | 208/52 CT |
| 2,331,473 | 10/1943 | Hyman | 208/52 CT |
| 2,336,165 | 12/1943 | Connolly | 208/52 CT |
| 2,430,724 | 11/1947 | Meadow | 502/36 |
| 3,255,102 | 6/1966 | Sanford et al. | 502/26 |
| 3,493,490 | 2/1970 | Plank et al. | 208/120 |
| 3,684,738 | 8/1972 | Chen | 252/412 |
| 3,692,692 | 9/1972 | Ward et al. | 252/412 |
| 3,835,028 | 9/1974 | Ward et al. | 208/111 |
| 3,899,441 | 8/1975 | Hansford | 502/54 |
| 3,933,983 | 1/1976 | Elliott, Jr. | 423/328 |
| 3,943,051 | 3/1976 | Ward | 502/26 |
| 3,969,267 | 7/1976 | McVicker | 502/26 |
| 4,139,433 | 2/1979 | Ward | 208/111 |
| 4,158,621 | 6/1979 | Swift et al. | 208/114 |
| 4,190,533 | 2/1980 | Ward | 252/412 |
| 4,192,770 | 3/1980 | Singleton | 502/26 |
| 4,192,771 | 3/1980 | Burboge et al. | 502/54 |
| 4,377,470 | 3/1983 | Hettinger, Jr. et al. | 208/120 |
| 4,424,116 | 1/1984 | Hettinger, Jr. | 208/120 |
| 4,477,582 | 10/1984 | Miale | 502/26 |
| 4,478,950 | 10/1984 | Chu | 502/85 |
| 4,500,419 | 2/1985 | Miale et al. | 208/115 |
| 4,500,422 | 2/1985 | Miale et al. | 208/117 |
| 4,556,749 | 12/1985 | Hazbun | 585/330 |
| 4,559,131 | 12/1985 | Miale | 208/111 |
| 4,596,704 | 6/1986 | Miale et al. | 423/328 |
| 4,678,763 | 7/1987 | Chang et al. | 502/26 |

OTHER PUBLICATIONS

"Petroleum Refining", by J. H. Gary and G. E. Handwerk; Marcel Dekker, Inc.; 1975.
"Catalytic Properties of Synthetic Fanjasites Modified with Fluoride Anians", by K. Becker et al.
Journal of Chemical Society, Faraday Trans. 1, 1987, 83, pp. 535–545.

*Primary Examiner*—Anthony McFarlane
*Attorney, Agent, or Firm*—K. K. Brandes

[57] ABSTRACT

A spent zeolite-containing catalytic cracking catalyst composition is reactivated by a process comprising the steps of contacting the catalyst composition with a solution of a suitable ammonium compound (preferably an aqueous solution of NH$_4$NO$_3$) and thereafter contacting the ammonium-exchanged cracking catalyst composition with a suitable fluorine compound (preferably a aqueous solution of NH$_4$F). A catalytic cracking process employs the reactivated cracking catalyst composition.

40 Claims, No Drawings

REACTIVATION OF SPENT CATALYTIC CRACKING CATALYST

BACKGROUND OF THE INVENTION

This invention relates to a method of reactivating spent zeolite-containing cracking catalysts by sequential treatment with suitable compounds.

Methods of rejuvenating deactivated zeolite-containing cracking catalysts are known and have been disclosed in the patent literature, e.g., in U.S. Pat. Nos. 4,559,131, 4,500,422 and 3,684,738. However, there is an ever present need to develop new, more effective and/or efficient methods of reactivating spent zeolite-containing cracking catalysts.

SUMMARY OF THE INVENTION

It is an object of this invention to provide a multi-step process for treating a spent zeolite-containing cracking catalyst composition under such conditions as to enhance its cracking activity. It is another object of this invention to provide a cracking process employing a reactivated spent cracking catalyst composition. Other objects and advantages will become apparent from the detailed description of the invention and the appended claims.

In accordance with this invention, a process for reactivating a spent cracking catalyst composition comprises the steps of:

(a) contacting a spent zeolite-containing cracking catalyst composition, at least a portion of which has previously been used in a cracking process (and has thereby lost some of its initial cracking activity, i.e., its cracking activity before its use in the cracking process) with a solution of an ammonium compound other than ammonium fluoride, under such conditions as to enhance the cracking activity of said catalyst composition, as measured by MAT conversion in accordance with ASTM method D 3907 (employing a catalyst composition which has been dried and activated by calcination);

(b) at least partially (preferably substantially) separating the catalyst composition having enhanced cracking activity obtained in step (a) from said solution used in step (a);

(c) contacting (treating) the at least partially separated cracking catalyst composition having undergone steps (a) and (b) with a suitable fluorine compound under such conditions as to enhance the cracking activity, as measured by the method recited in step (a), of the catalyst composition having undergone in steps (a) and (b); and (d) heating the reactivated cracking catalyst composition obtained in step (c) under said conditions as to obtain a dried reactivated catalyst composition.

In a preferred embodiment, the solution used in step (a) is an aqueous solution, more preferably a solution comprising water and ammonium nitrate. In another preferred embodiment, the fluorine compound used in step (c) is ammonium fluoride, more preferably dissolved in water. In a particularly preferred embodiment, the solution used in step (c) is an aqueous solution comprising about 0.3 to about 2 mol/l $NH_4F$.

Also in accordance with this invention, a catalytic cracking process is provided comprising the step of contacting a hydrocarbon containing feed stream with a zeolite-containing cracking catalyst composition, under such cracking conditions as to obtain at least one normally liquid (i.e., liquid at 25° C. and 1 atm.) hydrocarbon containing product stream having a lower initial boiling point and higher API gravity than said hydrocarbon-containing feed stream, wherein at least a portion of said zeolite-containing cracking catalyst composition is a reactivated spent catalyst composition having undergone steps (a) through (d), as defined above.

DETAILED DESCRIPTION OF THE INVENTION

Any spent zeolite-containing catalyst composition, at least a portion of which composition which has been used in a catalytic cracking process, can be used as starting material in step (a) of this invention. The term "spent", as used herein, implies that at least a portion of the zeolite-containing catalyst composition employed in step (a) has been used in a process for catalytically cracking hydrocarbon-containing oils, in particular those containing also sulfur and metal (Ni, V) impurities, and has then been regenerated by stripping of adhered oil from the catalyst (such as by steam-stripping) and subsequent heating in an oxidizing gas atmosphere (such as air) so as to burn off coke deposits on the catalyst composition. The spent catalyst composition used in the process of this invention can contain any portion of such regenerated catalyst composition, ranging from 100% to about 10 weight-% (i.e., containing 0% to about 90 weight-% fresh, unused zeolite-containing cracking catalyst composition). The term "spent catalyst composition" encompasses equilibrium cracking catalysts, which are commonly employed in commercial cracking operations and generally comprise a physical blend of regenerated used catalyst composition and fresh (unused) cracking catalyst composition. An equilibrium catalyst generally comprises a mixture of catalyst particles of various ages, i.e., a portion of the equilibrium catalyst particles has passed through a varying number of cracking regeneration cycles, while a small portion of the equilibrium catalyst particles is fresh (unused) cracking catalyst composition. Generally the reactivation process is applied to spent cracking catalyst compositions, the cracking activity of which has dropped to unacceptably low levels (i.e., too low to accomplish satisfactory cracking of feed oils).

The zeolite component of the spent zeolite-containing composition of this invention can be any natural or synthetic crystalline aluminosilicate zeolite which exhibits cracking activity. Non-limiting examples of such zeolites are faujasite, chabazite, mordenite, offretite, erionite, Zeolon, zeolite X, zeolite Y, zeolite L, zeolite ZSM-5, and the like (including other commercial ZSM zeolites), and mixtures thereof. Additional examples of suitable zeolites are listed in U.S. Pat. No. 4,158,621, the disclosure of which is hereby incorporated by reference. The term "zeolite", as used herein, includes zeolites from which a portion of Al has been removed from the crystalline framework, zeolites which have been ion-exchanged with rare earth metal or ammonium or by other conventional ion-exchange methods, essentially aluminum-free silica polymorphs, such as silicalite, chromia silicates, ferosilicates, barosilicates, and the like, as disclosed in U.S. Pat. No. 4,556,749, the disclosure of which is herein incorporated by reference.

Generally the zeolite component of the spent cracking catalyst composition is dispersed in a suitable solid refractory inorganic matrix material, such as alumina, silica, silica-alumina (presently preferred), aluminum phosphate, magnesium oxide, mixtures of two or more of the above-listed materials, and the like. The preparation of such zeolite/matrix cracking catalyst compositions is well known and is not a critical feature of this invention. Generally, the surface area (measured by nitrogen adsorption substantially in accordance with the BET method of Brunauer, Emmett and Teller) of the spent zeolite/matrix cracking catalyst composition used in step (a) is in the range of from about 100 to about 800 m$^2$/g. Generally, the weight ratio of zeolite to matrix material in the spent cracking catalyst composition is in the range of from about 1:20 to about 1:1.

The spent zeolite-containing cracking catalyst composition employed in step (a) of the process of the invention contains metal impurities (generally as oxides), such as oxides of Ni, V, Fe, Sb, Cu, Na, and the like. Each of these metal impurities can be present in amounts ranging from traces (about 0.01 weight-%) to about 1.0 weight-% (expressed as metal oxide). These impurities in spent cracking catalyst compositions have generally been absorbed from the oil feed in a previous cracking process, however, the origin of these metallic impurities is not believed to be a critical feature of this invention.

Any suitable ammonium compound other than ammonium fluoride can be used as solute in the solution employed in step (a) of this invention. Non-limiting examples of suitable ammonium compounds are: NH$_4$NO$_3$ (presently preferred), NH$_4$Cl, NH$_4$HSO$_4$, (NH$_4$)$_2$SO$_4$, NH$_4$HCO$_3$, (NH$_4$)$_2$HPO$_4$, NH$_4$ acetate, NH$_4$ oxalate, NH$_4$ hydroxide; (NH$_3$R)NO$_3$ (wherein R is an alkyl or cycloalkyl group having from 1–10 carbon atoms per molecule), (NH$_3$R)Cl, (NH$_3$R)HSO$_4$, and the like; (NH$_2$R$_2$)NO$_3$, (NH$_2$R$_2$)Cl, (NH$_2$R$_2$)HSO$_4$, and the like; (NHR$_3$)NO$_3$, (NHR$_3$)Cl, 9NHR$_3$)HSO$_4$, and the like; (NR$_4$)NO$_3$, (NR$_4$)Cl, (NR$_4$)HSO$_4$, and the like; and mixtures of the above ammonium compounds. It is understood that the ammonium compound must be sufficiently soluble in the solvent to be effective in step (a).

The solution employed in step (a) of the process can contain any suitable solvent which dissolves an amount of the ammonium compound sufficient to be effective in step (a). Non-limiting solvents are water (preferred), methanol, ethanol, propanol, ethyl acetate, acetone, mixtures of the above, and the like.

Any suitable concentration of the ammonium compound in the solution of step (a) can be employed. Generally the concentration of the ammonium compound is in the range of from about 0.01 to about 5 mol/l, preferably from about 0.1 to about 1 mol/l. Any suitable ratio of solution to spent zeolite-containing catalyst composition can be employed in step (a). Generally, the ratio of number of grams of spent catalyst composition to number of liters of solution is in the range of from about 1:1 to about 1000:1, preferably from about 10:1 to about 100:1. Generally, the ratio of the number of grams of spent catalyst to the number of moles of dissolved ammonium compound in step (a) is in the range of from about 1:1 to about 1000:1, preferably from about 10:1 to about 100:1.

The contacting of the spent zeolite-containing catalyst composition and the solution of the ammonium compound in step (a) can be carried out in any suitable manner. It can be done as a batch process in a vessel, preferably with agitation. Or it can be done continuously, such as by passing a solution of the ammonium compound through a column filled with a spent catalyst composition. Any suitable time of contact between solution and spent catalyst composition can be employed, generally from about 0.5 to about 10 hours (preferably about 1–4 hours). Any suitable temperature can be employed in step (a), generally from about 10° C. to about 100° C. (preferably about 80°–95° C.).

Any suitable means for at least partially (preferably substantially) separating the spent catalyst composition which has been treated in step (a) from the solution used in step (a) can be employed in step (b). Non-limiting examples of suitable solid/liquid separation means are filtration, centrifugation, settling and subsequent draining or decantation of the liquid, and the like.

Preferably, the at least partially separated catalyst composition is dried so as to substantially remove adhered solvent in particular water therefrom. Preferred drying conditions comprise a temperature of about 80°–120° C., at atmospheric pressure conditions, and a drying time of about 0.5–10 hours. Optionally, the at least partially (preferably substantially) separated catalyst composition is washed with a suitable liquid (e.g., water), preferably after the separation step (b) and before the above-described drying step.

Treatment step (c) can be carried out with any suitable, effective fluorine compound. Non-limiting examples of suitable fluorine compounds are NH$_4$F (preferred), NH$_4$HF$_2$, HF, NH$_4$BF$_4$, AlF$_3$, NH$_4$AlF$_4$, LaF$_3$, CeF$_3$, CeF$_4$, and other lanthanide fluorides, NH$_3$RF (wherein R is an alkyl or cycloalkyl radical having from 1–10 carbon atoms per molecule), NH$_2$R$_2$F, NHR$_3$F, NR$_4$F, RF (such as ethyl fluoride, and the like), and mixture of the above. The fluorine compound can be a gas or a liquid or a solid. Preferably, the fluorine compound employed in step (c) is a solid fluoride, more preferably NH$_4$F, dissolved in a suitable solvent (more preferably water or an aliphatic alcohol having from 1–8 carbon atoms per molecule).

In the preferred embodiment, a solution of a fluorine compound (more preferably NH$_4$F) in water having a concentration of about 0.3–2 mol/l (more preferably about 0.8–1.2 mol/l) of the fluorine compound is employed. Preferably, the ratio of number of millimoles of the fluorine compound to the number of grams of the at least partially separated (and preferably dried) NH$_4$-exchanged catalyst composition (having undergone steps a and b) is in the range of from about 0.01:1 to about 10:1, more preferably from about 0.2:1 to about 1:1. when a solution of the fluorine compound is employed, the ratio of the number of cubic centimeters of solution to the number of grams of at least partially separated (and preferably dried) NH$_4$-exchanged catalyst composition is in the range from about 0.04:1 to about 5:1, preferably from about 0.2:1 to about 1:1. Any suitable temperature, contact time, and other contacting features can be employed in step (c). Preferred temperature/time conditions in step (c) are the same as those in step (a). Preferably, step (c) is carried out with agitation, either as a continuous process or as a batch process.

Any heating conditions can be employed in step (d). Preferably, the catalyst composition which has undergone treatment steps (a), (b) and (c) is heated at a temperature in the range of from about 80° to about 700° C., preferably from about 450° to about 550° C. The heating time preferably is in the range of from about 0.1 to about 10 hours (more preferably 1–3 hours). Pressure conditions can be atmospheric (i.e., about 1 atm) or subatmospheric or superatmospheric. Preferably the heating step (d) is carried out in an oxidizing gas atmosphere, more preferably in a free oxygen containing gas such as air. However, an inert gas atmosphere can also be employed. It is within the scope of this invention to carry out heating step (d) in two substeps: first substantially drying the catalyst composition (preferably at about 80°–120° C. for about 0.5–5 hours), and thereafter calcining it (preferably at about 450°–550° C. for about 0.5–5 hours).

The reactivated catalyst composition obtained in step (d) can be used in any catalytic cracking process, i.e., a process for catalytically cracking hydrocarbon-containing oil feedstocks, in any suitable cracking reactor (e.g., in a FCC reactor or in a Thermofor moving bed reactor). The reactivated catalyst composition obtained in step (d) can be used alone, or can be mixed with fresh (unused) zeolite-containing catalyst composition for use in cracking processes.

The hydrocarbon-containing feed stream for the cracking process of this invention can be any suitable feedstock. Generally the feed has an initial boiling point (ASTM D 1160) in excess of about 400° F., preferably a boiling range of from about 400° to about 1200° F., more preferably a range of from about 500° to about 1100° F., measured at atmospheric pressure conditions. The API gravity (measured at 60° F.) generally is in the range of from about 5 to about 40, preferably from about 10 to about 35. Frequently these feedstocks contain Ramsbottom carbon residue (ASTM D 524; generally about 0.1–20 weight-%), sulfur (generally about 0.1–5 weight-%), nitrogen (generally about 0.05–2 weight-%), nickel (generally about 0.05–30 parts by weight per millions parts of feed, abbreviated ppm) and vanadium (generally about 0.1–50 ppm). Non-limiting examples of suitable feedstocks are light gas oils, heavy gas oils, vacuum gas oils, cracker recycle oils (cycle oils), residua (distillation bottoms fractions), and hydrotreated residua (e.g., hydrotreated in the presence of Ni, Co, Mo-promoted alumina catalysts), coal pyrolyzates, products from extraction of coal, products from liquefaction of coal, products from extraction or pyrolysis of tar sand, shale oils, heavy fractions of shale oils, and the like. The presently most preferred feedstocks are heavy gas oils and hydrotreated residua.

Any suitable reactor can be used for the catalytic cracking process of this invention. Generally a fluidized-bed catalytic cracking (FCC) reactor (preferably containing one or more risers) or a moving-bed catalytic cracking reactor (e.g., a Thermofor catalytic cracker) is employed, preferably a FCC riser cracking unit. Examples of such FCC cracking units are described in U.S. Pat. Nos. 4,377,470 and 4,424,116. Generally a catalyst regeneration unit (for removal of coke deposits) is combined with the FCC cracking unit, as is shown in the above-cited patents.

Specific operating conditions of the cracking operation depend greatly on the type of feed, the type and dimensions of the cracking reactor and the oil feed rate. Examples of operating conditions are described in the above-cited patents and in many other publications. In an FCC operation, generally the weight ratio of catalyst composition to oil feed (i.e., hydrocarbon-containing feed) ranges from about 2:1 to about 10:1, the contact time between oil feed and catalyst is in the range of from about 0.2 to about 2.0 seconds, and the cracking temperature is in the range of from about 800° to about 1200° F. Generally steam is added with the oil feed to the FCC reactor so as to aid in the dispersion of the oil as droplets. Generally the weight ratio of steam to oil feed is in the range of from about 0.05:1 to about 0.5:1.

The separation of spent (i.e., used) cracking catalyst from gaseous and liquid cracked products and the separation into various gaseous and liquid product fractions can be carried out by any conventional separation means. The most desirable product fraction is gasoline (ASTM boiling range: about 180°–400° F.). Non-limiting examples of such separation schemes are shown in "Petroleum Refining" by James H. Gary and Glenn E. Handwerk, Marcel Dekker, Inc., 1975. Generally, cracking catalysts are regenerated (preferably by steam stripping for removal of adhered oil and subsequent heating under oxidizing conditions so as to burn off carbon deposits). At least a portion of the regenerated cracking catalyst composition can then be treated by the reactivation process of this invention comprising steps (a)–(d), and thereafter be recycled to the cracking reactor, generally in admixture with fresh (unused) cracking catalyst.

The following examples are present to further illustrate this invention and are not to be considered as unduly limiting the scope of this invention.

EXAMPLE I

This example illustrates the reactivation of a first zeolite-containing equilibrium catalyst, i.e., a cracking catalyst a portion of which had been employed in a cracking process and had then been regenerated.

Catalyst A1 was a GXO-40 equilibrium catalyst, which had been supplied as fresh catalyst by Davison Chemical Division of W. R. Grace and Company, Baltimore, MD., and had been employed in a commercial FCC cracking process in a refinery of Phillips Petroleum Company and thereafter regenerated by heating in air. The fresh catalyst contained about 25 weight-% zeolite and 75 weight-% silica-alumina matrix. Catalyst A1 contained 0.21 weight-% Ni, 0.34 weight-% V, 0.58 weight-% Fe, 0.05–0.1 weight-% Sb and 0.44 weight-% Na. Catalyst A1 had a surface area of 104 $m^2/g$, a total pore volume of 0.30 cc/g, an apparent bulk density of 0.89 g/cc, and a zeolite unit cell size of 24.39 Å.

Catalyst A2 was prepared by treating 100 grams of Catalyst A1 with about 2 liters of a 0.4 molar aqueous solution of $NH_4F$ for 2 hours at 90° C. with stirring. The mixture of catalyst and solution was filtered, and the filter cake of Catalyst A2 was washed with distilled water and thereafter dried at 120° C.

Catalyst A3 was prepared by treating 100 grams of Catalyst A1 with about 2 liters of a 0.4 molar aqueous solution of $NH_4NO_3$ for 2 hours at 90° C. with stirring. The mixture of catalyst and solution was filtered, and the filter cake was washed with distilled water and dried at 120° C.

Catalyst A4 was prepared by treating 10 grams of Catalyst A3 with 10 cc of a 0.1 molar aqueous solution of $NH_4F$ for 2 hours at 90° C. with stirring. The mixture was filtered, and the filter cake was dried at 120° C. without having been washed.

Catalyst A5 was prepared in accordance with the procedure for Catalyst A4 except that a 0.3 molar aqueous solution of $NH_4F$ was used (in lieu of the 0.1 molar $NH_4F$ solution).

Catalyst A6 was prepared in accordance with the procedure for Catalyst A4 except that a 0.5 molar aqueous solution of $NH_4F$ was used (in lieu of 0.1 molar $NH_4F$ solution).

Catalyst A7 was prepared in accordance with the procedure for Catalyst A4 except that a 1.0 molar aqueous solution of $NH_4F$ was used (in lieu of 0.1 molar $NH_4F$ solution).

Catalysts A1 through A7 were calcined in air at 500° C. for two hours, and were then evaluated in a MAT (microactivity test) cracking test reactor, in accordance with ASTM method D 3907–80. MAT test conditions comprised a temperature of about 900° F., a catalyst to oil weight ratio of 3:1, and use of an Ekofisk gas oil feed (having API gravity at 60° C. of 26.9; viscosity at 100° C. of 5.0 centistoke; sulfur content of 0.39 weight-%, and nitrogen content of 0.1 weight-%). Test results are summarized in Table I.

TABLE I

| Run | Catalyst | Catalyst Treatment | MAT Conversion (Wt % of Feed) | Gasoline Yield (Wt % of Product) |
|---|---|---|---|---|
| 1 | A1 | None | 56.5 | 45.4 |
| 2 | " | " | 54.2 | 42.4 |
| 3 | " | " | 52.1 | 41.7 |
|   |    | Average: | 54.3 | 43.2 |
| 2 | A2 | 0.4 M $NH_4F$ | 59.2 | 46.6 |
| 3 | " | " | 58.3 | 47.9 |
| 4 | " | " | 56.5 | 45.2 |
|   |    | Average: | 58.0 | 46.6 |
| 5 | A3 | 0.4 M $NH_4NO_3$ | 63.6 | 48.1 |
| 6 | " | " | 63.9 | 48.5 |
|   |    | Average: | 63.8 | 48.3 |
| 7 | A4 | A3 + 0.1 M $NH_4F$ | 64.9 | 48.7 |
| 8 | " | " | 61.0 | 47.1 |
|   |    | Average: | 63.0 | 47.9 |
| 9 | A5 | A3 + 0.3 M $NH_4F$ | 68.4 | 49.3 |
| 10 | " | " | 63.5 | 47.6 |
|   |    | Average: | 66.0 | 48.5 |
| 11 | A6 | A3 + 0.5 M $NH_4F$ | 66.8 | 50.3 |
| 12 | " | " | 60.8 | 46.6 |
|   |    | Average: | 63.8 | 48.5 |
| 13 | A7 | A3 + 1.0 M $NH_4F$ | 60.5 | 46.9 |
| 14 | " | " | 57.5 | 47.3 |
|   |    | Average: | 59.0 | 47.1 |

Test results in Table I indicate that treatment of the GXO-40 equilibrium catalyst (i.e., Catalyst A1) with 0.4M (0.4 molar) $NH_4NO_3$ and then with 0.3–0.5M $NH_4F$ resulted in higher MAT conversion than treatment with either $NH_4NO_3$ or $NH_4F$ alone.

EXAMPLE II

This example illustrates the reactivation of a second zeolite-containing equilibrium cracking catalyst.

Catalyst B1 was a MS-370 equilibrium catalyst, which had been supplied as fresh catalyst by Engelhard Corporation, New York, NY, and had been employed in a commercial FCC cracking process in a refinery of Phillips Petroleum Company and thereafter regenerated by heating in air. The fresh catalyst contained about 25 weight-% zeolite and about 75 weight-% silica-alumina matrix. Catalyst B1 contained 0.14 weight-% Ni, 0.16 weight-% V, 0.80 weight-% Fe, 0.03 weight-% Cu, 0.02 weight-% Sb and 0.26 weight-% Na. Catalyst B1 had a surface area of 149 m²/g and a total pore volume of 0.39 cc/g.

Catalyst B2 was prepared by treating 100 grams of Catalyst B1 with about 2 liters of a 0.4 molar aqueous solution of $NH_4F$ for 2 hours at 90° C. with stirring. The mixture of catalyst and solution was filtered, and the filter cake was washed with distilled water and thereafter dried at 120° C.

Catalyst B3 was prepared by treating 100 grams of Catalyst B1 with about 2 liters of a 0.4 molar aqueous solution of $NH_4NO_3$ for 2 hours 90° C. with stirring. The mixture of catalyst and solution was filtered, and the filter cake was washed with distilled water and thereafter dried at 120° C.

Catalyst B4 was prepared by treating 10 grams of Catalyst B3 with 10 cc of a 0.1 molar aqueous solution of $NH_4F$ for 2 hours at 90° C. The mixture of catalyst and solution was filtered, and the filter cake was dried at 120° C. without having been washed.

Catalyst B5 was prepared in accordance with the procedure for Catalyst B4 except that a 0.3 molar aqueous solution of $NH_4F$ was used (in lieu of the 0.1 molar $NH_4F$ solution).

Catalyst B6 was prepared in accordance with the procedure for Catalyst B4 except that a 0.5 molar aqueous solution of $NH_4F$ was used (in lieu of the 0.1 molar $NH_4F$ solution).

Catalyst B7 was prepared in accordance with the procedure for Catalyst B4 except that a 1.0 molar aqueous solution of $NH_4F$ was used (in lieu of the 0.1 molar $NH_4F$ solution).

Catalysts B1 through B7 were calcined in air at 500° C. for 2 hours, and were then evaluated in a MAT cracking test unit in accordance with the procedure described in Example I. Test results are summarized in Table II.

TABLE II

| Run | Catalyst | Catalyst Treatment | MAT Conversion (Wt % of Feed) | Gasoline Yield (Wt % of Product) |
|---|---|---|---|---|
| 15 | B1 | None | 64.2 | 50.8 |
| 16 | " | " | 65.1 | 50.2 |
| 17 | " | " | 62.8 | 48.3 |
|   |    | Average: | 64.0 | 49.8 |
| 18 | B2 | 0.4 M $NH_4F$ | 73.9 | 53.0 |
| 19 | " | " | 69.7 | 51.7 |
| 20 | " | " | 67.5 | 50.0 |
|   |    | Average: | 70.4 | 51.6 |
| 21 | B3 | 0.4 M $NH_4NO_3$ | 70.8 | 50.0 |
| 22 | " | " | 68.2 | 50.2 |
|   |    | Average: | 69.5 | 50.1 |
| 23 | B4 | B3 + 0.1 M $NH_4F$ | 73.0 | 50.9 |
| 24 | " | " | 70.0 | 50.4 |
|   |    | Average: | 71.5 | 50.7 |
| 25 | B5 | B3 + 0.3 M $NH_4F$ | 72.2 | 48.6 |
| 26 | " | " | 70.6 | 48.3 |
|   |    | Average: | 71.4 | 48.5 |
| 27 | B6 | B3 + 0.5 M $NH_4F$ | 74.8 | 51.3 |
| 28 | " | " | 71.6 | 51.6 |
|   |    | Average: | 73.2 | 51.5 |
| 29 | B7 | B3 + 1.0 M $NH_4F$ | 73.3 | 51.8 |
| 30 | " | " | 72.2 | 51.5 |
|   |    | Average: | 72.8 | 51.7 |

Data in Table II show that treatment of the MS-370 equilibrium catalyst (i.e., Catalyst B1) with 0.4M $NH_4NO_3$ and then with 0.1–1.0M $NH_3F$ resulted in higher MAT conversion than treatment with either $NH_4NO_3$ or $NH_4F$ alone.

EXAMPLE III

This example is similar to Example I. A sample of a GXO-40 equilibrium catalyst which was slightly different from the GXO-40 catalyst used in Example I was used in this test series. This new sample of the GXO-40 equilibrium catalyst was labeled Catalyst C1.

Catalyst C2 was prepared in accordance with the procedure of Catalyst A2 (Example I) except that the NH$_4$F concentration was 1 molar (in lieu of 0.4 molar), and the above-described GXO-40 equilibrium catalyst sample was used in lieu of the one described in Example I.

Catalyst C3, C4, C5, C6 and C7, respectively, were prepared in accordance with the preparations for Catalysts A3, A4, A5, A6 and A7, respectively, except that the above-described GXO-40 equilibrium catalyst sample was used in lieu of the one described in Example I.

Catalysts C1 through C7 were calcined in air at 500° C. for 2 hours and were then evaluated in a MAT cracking test unit in accordance with the procedure described in Example I. Test results are summarized in Table III.

TABLE III

| Run | Catalyst | Catalyst Treatment | MAT Conversion (Wt % of Feed) | Gasoline Yield (Wt % of Product) |
|---|---|---|---|---|
| 31 | C1 | None | 54.9 | 43.6 |
| 32 | " | " | 54.4 | 43.5 |
| 33 | " | " | 54.2 | 43.6 |
| 34 | " | " | 57.2 | 43.7 |
|  |  | Average: | 55.2 | 43.6 |
| 35 | C2 | 1.0 M NH$_4$F | 59.3 | 45.7 |
| 36 | " | " | 62.7 | 47.1 |
| 37 | " | " | 58.1 | 47.6 |
| 38 | " | " | 57.3 | 45.6 |
| 39 | " | " | 59.1 | 46.9 |
|  |  | Average: | 59.3 | 46.6 |
| 40 | C3 | 0.4 M NH$_4$NO$_3$ | 61.3 | 45.8 |
| 41 | " | " | 62.7 | 46.7 |
|  |  | Average: | 62.0 | 46.3 |
| 42 | C4 | C3 + 0.1 M NH$_4$F | 61.6 | 46.6 |
| 43 | " | " | 61.7 | 45.7 |
|  |  | Average: | 61.7 | 46.2 |
| 44 | C5 | C3 + 0.3 M NH$_4$F | 61.9 | 46.3 |
| 45 | " | " | 66.6 | 48.0 |
| 46 | " | " | 62.2 | 47.4 |
|  |  | Average: | 63.6 | 47.2 |
| 47 | C6 | C3 + 0.5 M NH$_4$F | 64.3 | 47.4 |
| 48 | " | " | 63.9 | 47.2 |
|  |  | Average: | 64.1 | 47.3 |
| 49 | C7 | C3 + 1.0 M NH$_4$F | 64.6 | 47.9 |
| 50 | " | " | 63.1 | 48.9 |
|  |  | Average: | 63.9 | 48.4 |

Test data in Table III show that treatment of the GXO-40 equilibrium catalyst used in this example (i.e., Catalyst C1) with 0.4M NH$_4$NO$_3$ and then with 0.3–1.0M NH$_4$F resulted in higher MAT conversion and higher gasoline yield than treatment with either NH$_4$NO$_3$ or NH$_4$F alone.

EXAMPLE IV

This example describes tests similar to those of Example III except that large 50 lb. batches (in lieu of 10 g samples) of equilibrium catalyst GXO-40 described in Example III were used in the solution treatment. Pertinent test results are summarized in Table IV.

TABLE IV

| Run | Catalyst | Catalyst Treatment | MAT Conversion (Wt % of Feed) | Gasoline Yield (Wt % of Product) |
|---|---|---|---|---|
| 31 | C1 | None | 54.9 | 43.6 |
| 32 | " | " | 54.4 | 43.5 |
| 33 | " | " | 54.2 | 43.6 |
| 34 | " | " | 57.2 | 43.7 |
|  |  | Average: | 55.2 (from Table III) | 43.6 (from Table III) |
| 51 | C2 | 1.0 M NH$_4$F | 65.6 | 44.6 |
| 52 | " | " | 62.4 | 46.7 |
| 53 | " | " | 67.6 | 47.6 |
|  |  | Average: | 65.2 | 46.3 |
| 54 | C8 | 2.0 M NH$_4$F | 64.3 | 48.2 |
| 55 | " | " | 60.1 | 45.8 |
| 56 | " | " | 65.1 | 48.6 |
|  |  | Average: | 63.2 | 47.5 |
| 57 | C3 | 0.4 M NH$_4$NO$_3$ | (48.8)* | (39.8)* |
| 58 | " | " | 55.3 | 42.3 |
| 59 | " | " | 61.5 | 46.0 |
|  |  | Average: | 58.4 | 44.2 |
| 60 | C9 | C3 + 2.0 M NH$_4$F | 66.4 | 49.4 |
| 61 | " | " | 65.2 | 48.7 |
| 62 | " | " | 65.8 | 49.2 |
|  |  | Average: | 65.8 | 49.1 |

*Test data appear to be erroneous; not included in "Average".

Test data in Table IV show that treatment of a GXO-40 equilibrium catalyst with 0.4M NH$_4$NO$_3$ and then with 2M NH$_4$F resulted in higher MAT conversion and gasoline yield than treatment with 0.4M NH$_4$NO$_3$ or 2M NH$_4$F alone.

Reasonable variations, modifications and adaptations for various conditions and uses can be made within the scope of the disclosure and appended claims.

I claim:

1. A process for reactivating a spent catalytic cracking catalyst composition comprising the steps of
   (a) contacting a spent zeolite-containing catalytic cracking catalyst composition with a solution of an ammonium compound other than ammonium fluoride, under such contacting conditions as to enhance the catalytic cracking activity of said catalytic cracking catalyst composition;
   (b) at least partially separating the catalytic cracking catalyst composition having enhanced catalytic cracking activity obtained in step (a) from said solution used in step (a);
   (c) contacting the at least partially separated catalytic cracking catalyst composition having undergone steps (a) and (b) with a suitable fluorine compound, under such conditions as to enhance the catalytic cracking activity of the catalyst composition having undergone steps (a) and (b); and
   (d) heating the catalytic cracking catalyst composition obtained in step (c) under such conditions as to obtain a dried, reactivated catalytic cracking catalyst composition.

2. A process in accordance with claim 1, wherein said spent zeolite-containing catalytic cracking catalyst composition comprises a zeolite dispersed in a silica-alumina matrix at a weight ratio in the range of from about 1:20 to about 1:1.

3. A process in accordance with claim 1, wherein said solution used in step (a) is an aqueous solution comprising NH$_4$NO$_3$.

4. A process in accordance with claim 3, wherein the concentration of NH$_4$NO$_3$ in said solution used in step (a) is in the range of from about 0.01 to about 5 mol/l, and the ratio of the number of grams of spent catalytic cracking catalyst composition to the number of moles of $NH_4NO_3$ in step (a) is in the range of from about 1:1 to about 1000:1.

5. A process in accordance with claim 1, wherein said fluorine compound used in step (c) is $NH_4F$.

6. A process in accordance with claim 5, wherein $NH_4F$ is dissolved in water.

7. A process in accordance with claim 6, wherein the solution of $NH_4F$ in water has a concentration in the range of from about 0.3 to about 2.0 mol/l $NH_4F$.

8. A process in accordance with claim 6, wherein the ratio of the number of millimoles of $NH_4F$ to the number of grams of said at least partially separated catalytic cracking catalyst composition in step (c) is in the range of from about 0.01:1 to about 10:1.

9. A process in accordance with claim 1 comprising the additional step of drying the cracking catalyst composition obtained in step (b), before carrying out step (c).

10. A process in accordance with claim 1 comprising the additional steps of washing and thereafter drying the cracking catalyst composition obtained in step (b), before carrying out step (c).

11. A process in accordance with claim 1, wherein said heating conditions in step (d) comprise a temperature in the range of from about 80° to about 700° C. for a period of time in the range of from about 0.1 to about 10 hours.

12. A process in accordance with claim 11, wherein heating step (d) is carried in two sub-steps: first substantially drying the catalyst composition obtained in step (c), and thereafter calcining the dried catalyst composition at a temperature in the range of from about 450° to about 550° C.

13. A process in accordance with claim 1, wherein step (d) is carried out in a free oxygen containing gas atmosphere.

14. A process in accordance with claim 1, wherein step (a) is carried out with an aqueous solution of $NH_4NO_3$, step (c) is carried out with an aqueous solution of $NH_4F$, the concentration of $NH_4NO_3$ in the solution used in step (a) is about 0.1–1.0 mol/l, and the concentration of $NH_4F$ in the solution used in step (c) is about 0.8–1.2 mol/l.

15. A process in accordance with claim 1, wherein said spent zeolite-containing catalytic cracking catalyst composition used in step (a) contains metal impurities selected from the group consisting of oxides of Ni, V, Fe, Sb, Cu and Na.

16. A process in accordance with claim 15, wherein the level of said metal impurities is in the range of from about 0.01 to about 1.0 weight percent, expressed as metal oxide.

17. A catalytic cracking process comprising the step of contacting a hydrocarbon-containing feed stream with a catalytic cracking catalyst composition comprising a zeolite, under such catalytic cracking conditions as to obtain at least one normally liquid hydrocarbon-containing product stream having a lower initial boiling point and higher API gravity than said hydrocarbon-containing feed stream;
wherein at least a portion of said catalytic cracking catalyst composition is a reactivated spent catalytic cracking catalyst composition having undergone a process comprising the steps of:
(a) contacting a spent zeolite-containing catalytic cracking catalyst composition with a solution of an ammonium compound other than ammonium fluoride, under such contacting conditions as to enhance the catalytic cracking activity of said catalytic cracking catalyst composition;
(b) at least partially separating the catalytic cracking catalyst composition having enhanced catalytic cracking activity obtained in step (a) from said solution used in step (a);
(c) contacting the at least partially separated catalytic cracking catalyst composition having undergone steps (a) and (b) with a suitable fluorine compound, under such conditions as to enhance the catalytic cracking activity of the catalyst composition having undergone steps (a) and (b); and
(d) heating the catalytic cracking catalyst composition obtained in step (c) under such conditions as to obtain a dried, reactivated catalytic cracking catalyst composition.

18. A cracking process in accordance with claim 17, wherein said spent zeolite-containing catalytic cracking catalyst composition comprises a zeolite dispersed in a silica-alumina matrix at a weight ratio in the range of from about 1:20 to about 1:1.

19. A cracking process in accordance with claim 17, wherein said solution used in step (a) is an aqueous solution comprising $NH_4NO_3$.

20. A cracking process in accordance with claim 19, wherein the concentration of $NH_4NO_3$ in said solution used in step (a) is in the range of from about 0.01 to about 5 mol/l, and the ratio of the number of grams of spent catalytic cracking catalyst composition to the number of moles of $NH_4NO_3$ in step (a) is in the range of from about 1:1 to about 1000:1.

21. A cracking process in accordance with claim 17, wherein said fluoride compound used in step (c) is $NH_4F$.

22. A cracking process in accordance with claim 21, wherein $NH_4F$ is dissolved in water.

23. A cracking process in accordance with claim 22, wherein the solution of $NH_4F$ in water has a concentration in the range of from about 0.3 to about 2.0 mol/l $NH_4F$.

24. A cracking process in accordance with claim 17, wherein the ratio of the number of millimoles of $NH_4F$ to the number of grams of said at least partially separated catalytic cracking catalyst composition in step (c) is in the range of from about 0.01:1 to about 10:1.

25. A cracking process in accordance with claim 17 comprising the additional step of drying the cracking catalyst composition obtained in step (b), before carrying out step (c).

26. A cracking process in accordance with claim 17 comprising the additional steps of washing and thereafter drying the cracking catalyst composition obtained in step (b), before carrying out step (c).

27. A cracking process in accordance with claim 17, wherein said heating conditions in step (d) comprise a temperature in the range of from about 80° to about 700° C. for a period of time in the range of from about 0.1 to about 10 hours.

28. A cracking process in accordance with claim 27, wherein heating step (d) is carried in two sub-steps: first substantially drying the catalyst composition obtained in step (c), and thereafter calcining the dried catalyst composition at a temperature in the range of from about 450° to about 550° C.

29. A process in accordance with claim 18, wherein step (d) is carried out in a free oxygen containing gas atmosphere.

30. A cracking process in accordance with claim 17, wherein the solution used in step (a) is an aqueous solution comprising about 0.1-1.0 mol/l $NH_4NO_3$, and the solution used in step (c) is a aqueous solution comprising about 0.8-1.2 mol/l $NH_4F$.

31. A cracking process in accordance with claim 17, wherein said spent zeolite-containing catalytic cracking catalyst composition used in step (a) contains metal impurities selected from the group consisting of oxides of Ni, V, Fe, Sb, Cu and Na.

32. A cracking process in accordance with claim 31, wherein the level of said metal impurities is in the range of from about 0.01 to about 1.0 weight percent, expressed as metal oxide.

33. A cracking process in accordance with claim 17, wherein said hydrocarbon-containing feed stream has an initial boiling point, determined in accordance with ASTM method D 1160, of at least 400° F.

34. A cracking process in accordance with claim 17, wherein said hydrocarbon-containing feed stream has a boiling range of from about 400° F. to about 1200° F., measured at atmospheric pressure conditions, and an API gravity in the range of from about 5 to about 40.

35. A cracking process in accordance with claim 34, wherein said hydrocarbon-containing feed stream has a boiling range of from about 500° F. to about 1110° F. and an API gravity in the range of from about 10 to about 35.

36. A cracking process in accordance with claim 17, wherein said hydrocarbon-containing feed stream contains about 0.1-20 weight-% Ramsbottom carbon residue, about 0.1-5 weight-% sulfur, about 0.05-2.0 weight-% nitrogen, about 0.05-30 ppm nickel and about 0.1-50 ppm vanadium.

37. A cracking process in accordance with claim 17, wherein said hydrocarbon-containing feed stream is selected from the group consisting of light gas oils, heavy gas oils, cycle oils and residua.

38. A cracking process in accordance with claim 17, wherein said catalytic cracking conditions comprise a temperature in the range of from about 800° to about 1200° F., and a weight ratio of said reactivated spent catalytic cracking catalyst composition to said hydrocarbon-containing feed in the range of from about 2:1 to about 10:1.

39. A cracking process in accordance with claim 17, wherein steam in present at a weight ratio of steam to said hydrocarbon-containing feed stream in the range of from about 0.05:1 to about 0.5:1.

40. A cracking process in accordance with claim 17 comprising the additional steps of
separating used catalytic cracking catalyst composition from gaseous and liquid cracked products,
steam-stripping the thus separated used catalytic cracking catalyst composition, and
heating the steam-stripped catalytic cracking catalyst composition under oxidizing conditions so as to burn off coke deposited thereon.

* * * * *